UNITED STATES PATENT OFFICE.

GEORG KALISCHER, OF MAINKUR, NEAR FRANKFORT-ON-THE-MAIN, GERMANY, ASSIGNOR TO CASSELLA COLOR COMPANY, A CORPORATION OF NEW YORK.

DISAZO DYES AND PROCESSES OF MAKING SAME.

1,079,415.  Specification of Letters Patent.  Patented Nov. 25, 1913.

No Drawing.  Application filed February 27, 1913. Serial No. 750,943.

*To all whom it may concern:*

Be it known that I, GEORG KALISCHER, Ph. D., a subject of the King of Prussia, and residing at Waldstrasse 23, Mainkur, near Frankfort-on-the-Main, Germany, have invented certain new and useful Improvements in Disazo Dyes and Processes of Making Same, of which the following is a full description.

My invention consists in preparing disazo dyestuffs of the general formula

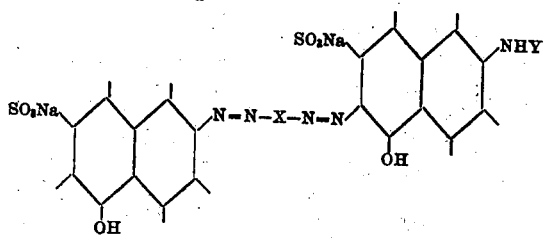

(in which X represents the nucleus of an amino compound and Y hydrogen or any alkyl or aryl or acidyl group). They contain as first and last components molecules of 2.5.aminonaphthol.7.sulfonic acid or its derivatives, the middle component being any amino compound which allows of subsequent diazotizing.

The new dyestuffs possess excellent affinity to the cotton fiber. They yield reddish violet to blue dyeings which, treated with p-nitrodiazobenzene, are developed into considerably deeper dyeings of very clear violet to blue shades which possess, besides excellent fastness to washing and light, the valuable property of yielding pure white discharge effects.

The new dyestuffs are prepared by combining the diazo compound of 2.5.aminonaphthol.7.sulfonic acid with an amino compound (such as m-amino-p-cresol-methylether, α-naphthylamin, 1.6. or 1.7. naphthylaminsulfonic acid, 2.8.6. or 2.5.7. aminonaphtholsulfonic acid), the new dyestuffs being dark powders, soluble in water with a violet to blue color soluble in concentrated sulfuric acid with a blue to bluish green color. The process of manufacture is illustrated by the following examples:

Example I: The diazo compound prepared in the usual manner from 23.9 kilos 2.5.aminonaphthol.7.sulfonic acid is introduced into the aqueous solution of 13.7 kilos m-amino-p-cresolmethylether and 14 kilos hydrochloric acid, the solution having been heated to 25° C. By gradually adding acetate of soda, the free mineral acid is neutralized. After the reaction is complete, the aminoazo dyestuff is filtered off and then dissolved by means of 23 kilos soda lye; 6.9 kilos nitrite are added and the solution is poured into an excess of dilute hydrochloric acid. The diazotized compound thus obtained is poured into a cold solution of 31.5 kilos 2.5.phenylaminonaphthol.7.sulfonic acid, kept alkaline with carbonate of soda. The dyestuff is filtered off and dried. It is a dark powder, easily soluble in water with a violet blue color, dissolving in concentrated sulfuric acid with a bluish green color, and dyes cotton direct violet blue shades, which by an after treatment with p-nitrodiazobenzene yield clear blue shades. It has the formula

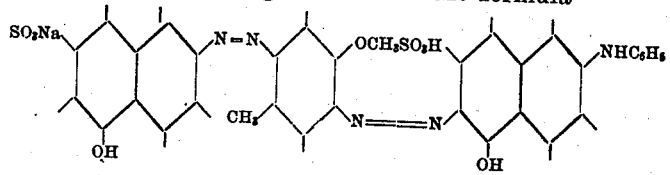

If the end component 2.5.phenylaminonaphthol.7.sulfonic acid is replaced by 2.5.aminonaphthol.7.sulfonic acid or 2.5.benzoylaminonaphthol.7.sulfonic acid, dyestuffs result possessing similar properties, but of somewhat redder shade.

Example II: The diazo compound obtained from 23.9 kilos 2.5.aminonaphthol.7.-sulfonic acid is combined with 23.9 kilos 2.5.-aminonaphthol.7.sulfonic acid in the presence of soda. The monazo dyestuff is filtered off, suspended in water and diazotized by the addition of 40 kilos hydrochloric acid and 6.9 kilos nitrite. The diazotized compound thus obtained is poured into a solution of 23.9 kilos 2.5.aminonaphthol.7.sulfonic acid containing an excess of soda. The dyestuff is precipitated with common salt, filtered off and dried. The same dyestuff can be prepared in a slightly different way by combining the monazo dyestuff, dissolved in an excess of soda, with the diazo compound obtained from 23.9 kilos 2.5.aminonaphthol.7.sulfonic acid. The dyestuff is a dark powder soluble in water with a violet color, soluble in concentrated sulfuric acid with a blue color, dyeing reddish violet shades which turn a blue violet when treated with p-nitrodiazobenzene.

Having now described my invention and the manner in which it may be carried out, what I claim is:

1. The herein described process of producing disazo dyes having the general formula

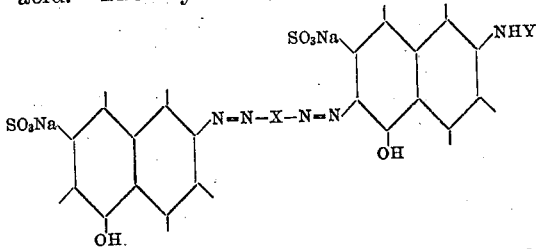

(X representing the nucleus of an amino compound, Y meaning a univalent radical) which consists in combining one molecule of diazotized 2.5.aminonaphthol.7.sulfonic acid with one molecule of an amino compound suitable to be further diazotized, then diazotizing the monoazo dyestuff thus obtained and combining in alkaline solution with one molecule of a 2.5.aminonaphthol.7.sulfonic compound substantially as described.

2. The herein described process of producing disazo dyes by combining one molecule of diazotized 2.5.aminonaphthol.7.sulfonic acid with one molecule of m-amino-p-cresolmethylether, then diazotizing the monoazo dyestuff thus obtained and combining in alkaline solution with one molecule of 2.5.-phenylaminonaphthol.7.sulfonic acid substantially as described.

3. The herein described disazo dyes having the general formula

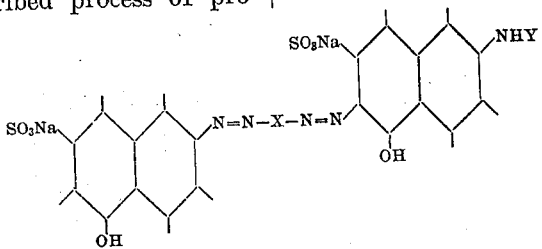

(X representing the nucleus of an amino compound, Y meaning a univalent radical) being dark powders soluble in water with a violet to blue color, dissolving in concentrated sulfuric acid with a blue to bluish green color, dyeing cotton in reddish violet to blue shades which treated with p-nitrodiazobenzene yield violet to blue shades fast to washing and light and which can be discharged to a pure white, substantially as described.

4. The herein described disazo dyestuff of the formula

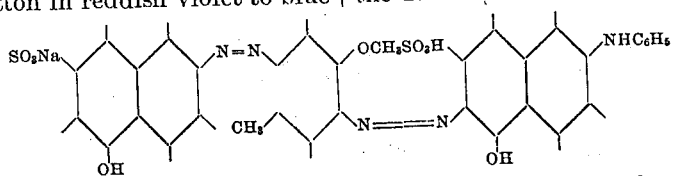

being a dark powder soluble in water with a violet blue color, dissolving in concentrated sulfuric acid with a bluish green color, dyeing cotton in violet blue shades, which treated with p-nitrodiazobenzene yield clear blue shades fast to washing and light and which can be discharged to a pure white, substantially as described.

In witness whereof I have hereunto signed my name this 12th day of February 1913, in the presence of two subscribing witnesses.

DR. GEORG KALISCHER.

Witnesses
JEAN GRUND,
CARL GRUND.